US008452969B2

(12) United States Patent
Iyer et al.

(10) Patent No.: US 8,452,969 B2
(45) Date of Patent: May 28, 2013

(54) FLEXIBLE BROADCAST AUTHENTICATION IN RESOURCE-CONSTRAINED SYSTEMS: PROVIDING A TRADEOFF BETWEEN COMMUNICATION AND COMPUTATIONAL OVERHEADS

(75) Inventors: Aravind V. Iyer, Karnataka (IN); Debojyoti Bhattacharya, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 859 days.

(21) Appl. No.: 12/561,013

(22) Filed: Sep. 16, 2009

(65) Prior Publication Data
US 2011/0066859 A1 Mar. 17, 2011

(51) Int. Cl.
*H04L 9/32* (2006.01)
(52) U.S. Cl.
USPC .......................................... 713/176; 713/177
(58) Field of Classification Search
USPC ......................................................... 713/176
See application file for complete search history.

(56) References Cited

U.S. PATENT DOCUMENTS

| 4,881,264 A * | 11/1989 | Merkle | 713/177 |
| 2004/0062390 A1 | 4/2004 | Slavin | |
| 2007/0174626 A1 | 7/2007 | Huh | |
| 2008/0181413 A1 | 7/2008 | Yi | |
| 2008/0282089 A1 | 11/2008 | Futa | |
| 2010/0086132 A1 | 4/2010 | Tavernier | |

OTHER PUBLICATIONS

Buchmann, Johannes; Garcia, Luis; Dahmen, Erik; Döring, Martin; Klintsevich, Elena; "CMSS—An Improved Merkle Signature Scheme," Progress in Cryptology—INDOCRYPT 2006, Lecture Notes in Computer Science, Springer Berlin / Heidelberg, 978-3-540-49767-7, pp. 349-363.*

Adrian Perrig. 2001. The BiBa one-time signature and broadcast authentication protocol. In Proceedings of the 8th ACM conference on Computer and Communications Security (CCS '01), Pierangela Samarati (Ed.). ACM, New York, NY, USA, 28-37.*

Qiyan Wang; Khurana, H.; Ying Huang; Nahrstedt, K.; , "Time Valid One-Time Signature for Time-Critical Multicast Data Authentication," INFOCOM 2009, IEEE , vol., no., pp. 1233-1241, Apr. 19-25, 2009.*

Dalit Naor; Shenhav, A.; Wool, A.; , "One-Time Signatures Revisited: Practical Fast Signatures Using Fractal Merkle Tree Traversal," Electrical and Electronics Engineers in Israel, 2006 IEEE 24th Convention of , vol., no., pp. 255-259, Nov. 15-17, 2006.*

* cited by examiner

*Primary Examiner* — Carl Colin
*Assistant Examiner* — Syed Zaidi
(74) *Attorney, Agent, or Firm* — John A. Miller; Miller IP Group, PLC (57) ABSTRACT

A method for authenticating a message that is transmitted wirelessly. The method includes providing a set of private key values that define a private key and performing a key pair generation process that provides a key pair including the private key and a public key, where performing the key pair generation process includes applying one or more hash functions to the private key values, where a succeeding hash function provides a hash of a previous hash function. The scheme uses a signature generation process that generates a message digest by applying a hash function on the message to be signed and then separates the message digest into two parts including signing bits and selection bits and using the private key to sign the message. A receiver verifies the authenticity of the received message using the public key and a signature verification algorithm.

14 Claims, 4 Drawing Sheets

FLEXIBLE BROADCAST AUTHENTICATION IN RESOURCE-CONSTRAINED SYSTEMS: PROVIDING A TRADEOFF BETWEEN COMMUNICATION AND COMPUTATIONAL OVERHEADS

BACKGROUND OF THE INVENTION

1. Field of the Invention

This invention relates to a one-time signature authentication scheme for wireless communications and, more particularly, to a flexible authentication scheme for authenticating messages sent wirelessly between vehicles that is a combination of a Winternitz one-time signature scheme and a hash to obtain random subset one-time signature scheme that provides a trade-off between communication and computational overhead.

2. Discussion of the Related Art

Vehicle-to-vehicle (V2V) wireless communications have been proposed for improved automobile safety. Under these applications, vehicles broadcast information over the wireless medium to one another. V2V applications aim to assist drivers in avoiding accidents by providing early warnings and advisories about potentially dangerous situations using the messages exchanged over the wireless medium. Vehicle-to-vehicle safety applications, such as blind spot warning (BSW) systems and cooperative collision warning (CCW) systems, rely on periodic V2V communications, such as the wireless dedicated short range communications (DSRC) standard. The advisories include road condition notification, co-operative collision warning, and so on. Security is critical in V2V driver assistance applications since drivers of vehicles are expected to make driving maneuvers based on the advisories they receive.

The wireless messages are typically transmitted at 10 Hz per vehicle, and are typically authenticated using digital signatures based on an underlying public key infrastructure (PKI) in accordance with the IEEE 1609.2 standard specification. Each principal in a PKI system has a pair of keys, namely a private key and a public key. The private key is known only to the principal and the public key can be shared with other entities in the system. The keys can be visualized as a pair of functions $P_r$ and $P_u$ representing the private and public keys, respectively, and having the property $M=P_r(P_u(M))$ and $M=P_u(P_r(M))$, where M is the message that is to be secured using the keys. To ensure message integrity, the sender of the message signs the message with his private key, and adds the signature to the message. Upon receiving the message, the recipient can verify the signature of the message using the sender's public key.

Although the discussion herein pertains to V2V networking, the various broadcast authentication techniques have a much wider application. At an abstract level, the various broadcast authentication techniques discussed herein apply to communication networks where nodes broadcast information to one another in an authentic manner. In these networks, potentially every node is a sender and a receiver. Thus, a given node would broadcast its packets to multiple nodes, and it may also receive packets from multiple, and possibly different, nodes. It is desirable to conserve bandwidth in these types of communication networks. Bandwidth is consumed when the public key is sent ahead of the messages or packets. Additional bandwidth is also consumed when signatures are appended to messages or packets. It is also desirable to conserve the use of the vehicle computer or CPU for verifying received messages. If all nodes send messages at some rate, then a vehicle might receive many more messages as compared to how many it sends. Thus, generally, when computational overhead is referred to, the time taken for key generation and signature generation is ignored, and the process focuses only on the time taken for signature verification.

Providing security in V2V driver assistance applications amounts to ensuring authenticity and integrity of the messages transmitted over the air. In other words, security in the sense of broadcast authentication. There are a number of challenges in providing security for V2V communications for the aforementioned driver assistance applications. The challenges include (i) resource constrained computing platforms, (ii) real-time latency requirements on the V2V messages, (iii) scarce communication bandwidth, and (iv) possibly rapid changes in the network topology. Such demands require the various algorithms to achieve security to impose minimal computations and communication overheads.

For the communications networks being discussed herein, the nodes would typically use an authentication protocol to achieve broadcast authenticity of the messages. An authentication protocol between a sender and a receiver enables the sender to send information to the receiver in an authentic manner. The authentication protocol used in the broadcast networks being discussed includes three steps, namely, key generation and public key distribution, signature generation and signature verification. For key generation and public key distribution, the sender executes a key generation algorithm for the authentication protocol and creates the public key, the private key and other variables. The sender then disseminates the public key to the receivers.

For signature generation, when the sender needs to send an authentic message, the sender creates the message and populates it with the appropriate information, and then uses a signature generation algorithm for the authentication protocol. In the case of digital signature algorithms, one public-private key pair can be used to sign a theoretically unlimited number of messages. In the case of one-time signature algorithms, as the name suggests, one public-private key pair can be used to sign only one message. Thus, in order to sign a message using a one-time signature, the sender needs to use the key generation algorithm and distribute the public key ahead of time. The signature generation algorithm generally uses the hash-and-sign paradigm. This means that the message is first hashed into a constant length string of bits. The hashed version, also called the message digest, is then signed using the signature generation algorithm.

For signature verification, when a receiver needs to verify the authenticity of a received message, it needs to have in its possession the public key corresponding to the private key that signed the message. Assuming that the receiver does not have the public key, it uses the signature verification algorithm for the authentication protocol. The verification algorithm also first hashes the message to derive the message digest, which is then subject to further verification steps.

The problem of broadcast authentication has been well-studied in the literature. However, there is no existing scheme that achieves all of the desired properties. For example, digital signatures achieve broadcast authentication with a reasonable communication overhead, such as elliptic curve digital signature algorithm (ECDSA). However, they are computationally quite intensive. One-time signature (OTS) schemes are a computationally efficient alternative, albeit at the expense of increased communication overhead.

ECDSA is a digital signature algorithm that can be used to sign a theoretically unlimited number of messages with a given public-private key pair. It is very bandwidth efficient since it has a small public key size and signature size. However, it is extremely computational intensive. A single hash operation, which is the building block of one-time signature algorithms, is four-five orders of magnitude quicker to execute on a generic processor as compared to an ECDSA signature generation or verification. For specialized hardware, the difference may even be higher.

A hash to obtain random subset (HORS) is a one-time signature algorithm that is generally used to sign only one message with a given public-private key pair. It may be used to sign multiple messages, but the security degrades rapidly. HORS is designed to be a fast authentication scheme, so it is extremely efficient computationally since it involves just a few hash operations. However, its bandwidth overhead is quite overwhelming, its signature size is moderate, but its public key size is extremely large, i.e., six-seven orders of magnitude higher than ECDSA.

The known Winternitz one-time signature scheme can only be used to sign one message for a given public-private key pair. It is designed to be bandwidth efficient, and its signature size is moderate and its public key size is smaller than even ECDSA. Further, its computational overhead is still one-two orders of magnitude smaller than that of ECDSA.

OTS schemes are typically constructed using the basic building blocks of a one-way hash function. One-way hash functions are functions that are easy to compute, but computationally infeasible to invert. The security of the OTS scheme depends on the security of the underlying one-way hash function. In general, OTS schemes are constructed using the following general methodology. A set of private values (often known as seals) is selected randomly. This serves as the private key. A set of public keys (often known as verifiers) is them computed by applying a one-way hash function on the private keys. The set of public keys is transmitted authentically to all receivers. When signing a message, the message is mapped to a subset of private key values, and that subset is released as a signature. Usually, the one-way hash function that is used in the OTS scheme is public. The receiver performs a sequence of one-way hash function computations that would transform the released signature values into some of the public key values which were authentically communicated earlier. The security of the signature lies in the fact that to forge a signature, the attacker has to perform at least one inversion of the underlying one-way hash function. These steps are shown below.

1. Select a one-way hash function, say, H: $\{0,1\}^* \rightarrow \{0,1\}^L$.
2. Randomly choose a set of private values each of length L.
3. Generate one or a set of public values applying H(.) on the private values.
4. The set of private values act as private/signing key.
5. The set of public values act as public/verification key.
6. Map the message to be signed to the sub-set of private keys.
7. Release the sub-set of private keys obtained in step 6 as a signature.

SUMMARY OF THE INVENTION

In accordance with the teachings of the present invention, a flexible authentication scheme is disclosed that is a combination of a Winternitz one-time signature scheme and a hash to obtain random subset one-time signature scheme to provide consideration for communication and computational overhead. In one embodiment, the flexible authentication scheme provides a matrix that includes rows of private key values and columns of private key values. The scheme performs a key pair generation process that provides a key pair including a private key and a public key for each row in the matrix, where the private key is a set of private key values for that row. Performing the key pair generation process includes applying a plurality of hash functions to the private key values, where a succeeding hash function provides a hash of the previous hash function. The scheme uses a signature generation algorithm that first computes a message digest by applying a hash function on the message to be signed, and then separates the message digest into two parts including signing bits and selection bits. The selection bits select which rows in the matrix are used to sign the message and the signing bits are signed by a signing algorithm using the private key values from the selected row. A receiver verifies the authenticity of the received message using the public key and a signature verification algorithm.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a flexible authentication scheme for authenticating wireless messages that is a combination of the Winternitz and HORS one-time signature schemes is merely exemplary in nature, and is in no way intended to limit the invention or its applications and uses.

OTS schemes are an alternative to conventional digital signatures to provide broadcast authentication in V2V systems. OTS schemes published in the literature, namely, the Winternitz and HORS OTS schemes, provide a tradeoff between communication and computational overhead, which is unsatisfactory since a linear reduction of one overhead requires tolerating an exponential increase in the other one. Two flexible authentication schemes are proposed below that provide a better tradeoff between these two overheads, specifically providing an exponential reduction of one of the overheads in return for an exponential increase in the other.

Figure 1:
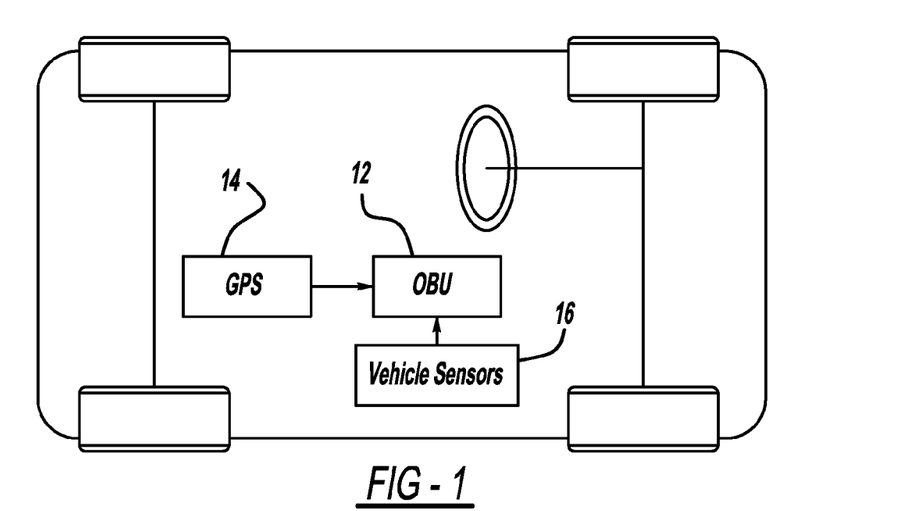
FIG. 1 is a plan view of a vehicle including a vehicle-to-vehicle communications system.

FIG. 1 illustrates a plan view of a vehicle 10 including an on-board unit (OBU) 12 for a V2X wireless communications system. The OBU 12 receives location information from a GPS receiver 14, and is able to communicate with other OBUs on other vehicles within a limited range. The vehicle 10 also includes various types of vehicle sensors 16, such as cameras, accelerometers, temperature sensors, etc., that provide information to the OBU 12. The vehicle sensor information can be used by the OBU 12 to notify other vehicles of various road and other conditions, such as ice, oil spills, etc.

Figure 2:
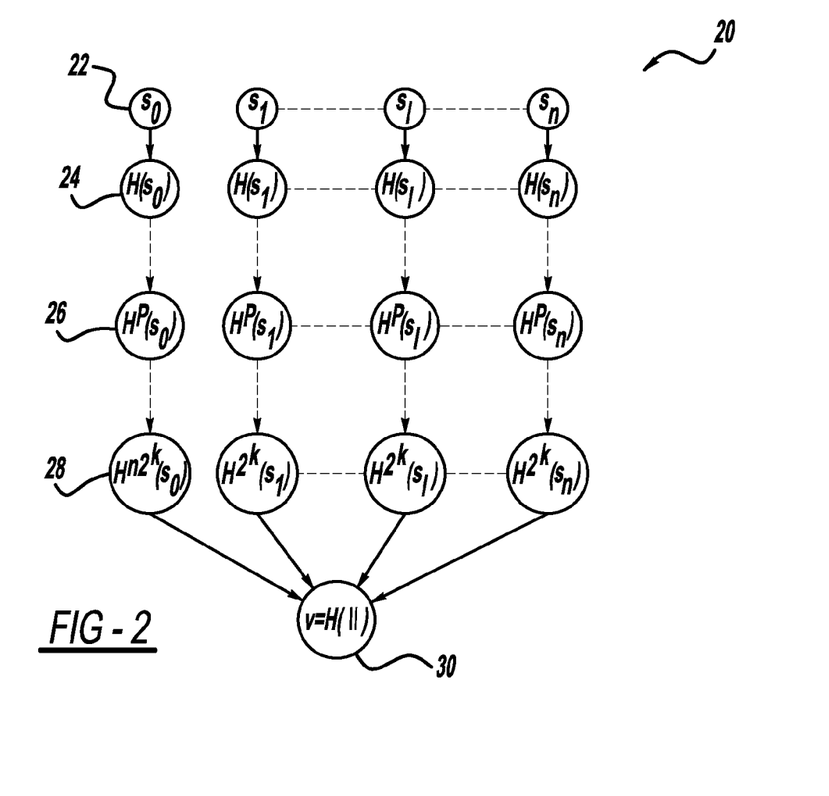
FIG. 2 is a plan view of a Winternitz one-time signature scheme for authenticating messages.

FIG. 2 is a plan view of a known Winternitz OTS scheme 20. The scheme 20 includes a series of private key values 22 represented here as $s_0, s_1, \ldots, s_1, ---, s_n$. The set of private key values 22 is a private key S. A series of hash functions 24, 26 and 28 are applied to the private key values 22, shown here as hash function H, hash function $H^p$ and hash function $H^2$, respectively, that are provided according to some predetermined and predefined rules. The results of the final hash function 28 are concatenated together to arrive at a verifier 30, represented as v, which is a public key V that has previously been disseminated to the vehicles. In this example, each of the private key values 22 are hashed $H^{2^k}$ times.

Algorithm 1 below is a key generation and public key distribution algorithm for the authentication protocol that shows how the private and public key pair S and V is generated for the private key S and the public key V using the hash functions shown in FIG. 2, where S is the set of private key values 22 and v is the verifier 30. Algorithm 2 below is a signature generation algorithm for the authentication protocol that shows how the Winternitz OTS scheme provides signature generation using the hashed version or message digest. Algorithm 3 below is a signature verification algorithm for the authentication protocol that shows how the receiving vehicle provides signature verification of the signature on the message M after it has the signature $\sigma_M$ and the verifier v using the hash functions H.

Algorithm 1, Winternitz Key Pair Generation:
Input: hash function $H:\{0,1\}^* \rightarrow \{0,1\}^L$, block parameter k and n=L/k
Output: signature key S, verification key V
  1: Choose n and k such that L=n·k
  2: Choose $s_0, s_1, \ldots, s_n \in_R \{0,1\}^L$ uniformly at random, i.e., choose n+1 random variable of length L
  3: Set S=$\{s_0, s_1, \ldots, s_n\}$
  4: Compute $y_i = H^{2^k}(s_i)$ for i=1, 2, … n
  5: Compute $z = H^{n \cdot 2^k}(s_0)$
  6: Compute $V = H(y_1 \| y_2 \| \ldots \| y_n \| z)$, where $\|$ denotes concatenation
  7: Private key: =S, Public key: =V
  8: return (S,V)

Figure 3:
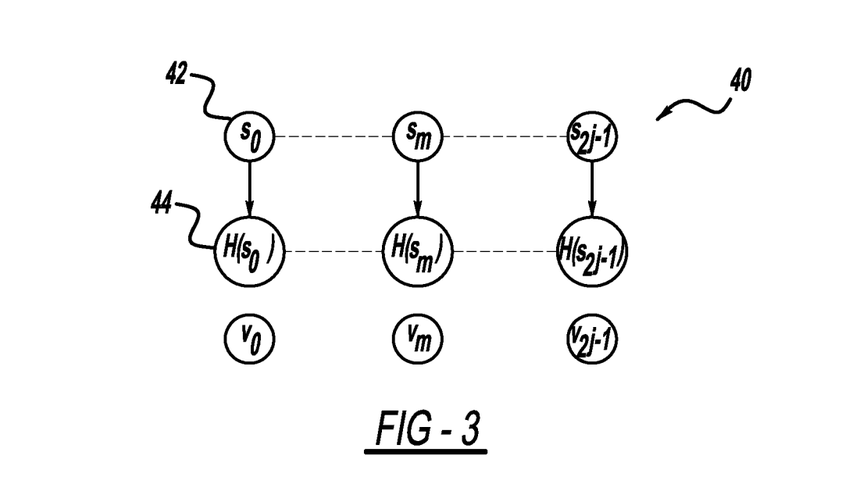
FIG. 3 is a plan view of an HORS one-time signature scheme for authenticating messages.

Algorithm 2, Winternitz Signature Generation:
Input: hash function $H:\{0,1\}^* \rightarrow \{0,1\}^L$, block parameter k and n=L/k, Message M, signature key S
Output: One time signature $\sigma_M$ on M
  1: Compute H(M) from M
  2: Break H(M) in 'n', k-bit words $b_1, b_2, \ldots, b_n$
  3: Compute $b_0 = \sum_{i=1}^{n} b_i$
  4: The signature of M is $\sigma_M = [H^{b_1}(s_1) \| H^{b_2}(s_2) \| \ldots \| H^{b_n}(s_n) \| H^{n \cdot 2^k - b_0}(s_0)]$ Algorithm 3, Winternitz Signature Verification:
Input: hash function $H:\{0,1\}^* \rightarrow \{0,1\}^L$, block parameter k and n=L/k, Message M, signature $\sigma_M$, verification key V
Output: TRUE if the signature is valid, FALSE otherwise
  1: Compute $b_1, b_2, \ldots, b_n, b_0$ as in Algorithm 2
  2: Denote the $\sigma_M$ received as composed of $\hat{h}_1 \| \hat{h}_2 \| \ldots \| \hat{h}_n \| \hat{h}_0$
  3: Compute $x_i = H^{2^k - b_i}(\hat{h}_i)$ for i=1,2,…, n
  4: Compute $w = H^{b_0}(\hat{h}_0)$
  5: Compute $V' = H(x_1 \| x_2 \| \ldots \| x_n \| w)$
  6: If V'=V then return TRUE, else return FALSE FIG. 3 is a plan view of a known HORS OTS scheme 40 for providing message verification. The scheme 40 includes a series of private key values 42, represented as $s_0, \ldots, s_m, \ldots, s_{2^{j+1}}$, and a row of hash functions 44, represented as H, for each private key value 42. The hash functions 44 generate a series of public key values 46, represented as verifiers v. The set of private key values 42 is the private key S and the set of public key values 46 is the public key V.

Algorithm 4 below is a generation and public key distribution algorithm for the authentication protocol that shows how the private and public key pair S and V is generated for the private key S and the public key V using the hash function H. Algorithm 5 below is a signature generation algorithm for the authentication protocol that shows how the HORS OTS scheme provides signature generation using the hash version or message digest. Algorithm 6 below is a signature verification algorithm for the authentication protocol that shows how the receiving vehicle provides signature verification of the signature on the message M after it has the signature $\sigma_M$ and the public key V using the hash function H.

Algorithm 4, HORS Key Pair Generation:
Input: hash function $H:\{0,1\}^* \rightarrow \{0,1\}^L$, block parameter j and n=L/j
Output: signature key S, verification key P
  1: Choose n and j such that L=n·j
  2: Choose $s_0, s_1, \ldots, s_{2^{j}-1} \in_R \{0,1\}^L$ uniformly at random, i.e. choose $2^j$ random variables of length L
  3: Set S=$\{s_0, s_1, \ldots, s_{2^{j}-1}\}$
  4: Compute $p_i = H(s_i)$ for i=0, 1, … $2^{j-1}$
  5: Set P=$\{p_0, p_1, \ldots, p_{2^{j}-1}\}$
  6: Private key: =S, Public key: =P
  7: return (S,P)

Algorithm 5, HORS Signature Generation:
Input: hash function $H:\{0,1\}^* \rightarrow \{0,1\}^L$, block parameter j and n=L/j, Message M, signature key S
Output: One time signature HORS(M) on M
  1: Compute H(M) from M
  2: Break H(M) in 'n', j-bit words $b_1, b_2, \ldots, b_n$
  3: Interpret each $b_i$ as integers between 0 to $2^{j-1}$
  4: Signature of M is HORS(M)=$s_{b_1} \| s_{b_2} \| \ldots \| s_{b_n}$
  5: return HORS(M)

Algorithm 6, HORS Signature Verification:
Input: hash function $H:\{0,1\}^* \rightarrow \{0,1\}^L$, block parameter j and n=L/j, Message M, signature key HORS (M), verification key P
Output: TRUE if the signature is valid, FALSE otherwise
  1: Compute $b_1, b_2, \ldots, b_n$ as in Algorithm 5
  2: Interpret each $b_i$ as integer between 0 to $2^{j-1}$
  3: return TRUE if for each i=1, …, n, $H(s_i)=p_i$, else return FALSE In this way, by the Winternitz OTS scheme employs a signature verification using a relatively few number of private key values 22, but a large number of hash functions 24, 26 and 28, and the HORS OTS scheme employs a signature verification using a relatively large number of private key values 42, but a single hash function 44.

The communication and computational overhead associated with the Winternitz OTS scheme and the HORS OTS scheme are shown in Table 1 below. The communication overhead is the additional number of bits b that need to be transmitted for every message M that is secured using the OTS scheme. For every message M to be signed, the corresponding public key V has to be distributed ahead of time, and the signature σ has to be appended to the message M. Thus, the communication overhead is the sum of the public key size (in bits) and the signature size (in bits). The computational overhead is the number of hash function computations required to verify the OTS. The security level is the hardness of breaking the OTS in terms of the key length (in bits) of an equally hard symmetric key cipher.

TABLE 1

| OTS Scheme | Communication Cost | Computation Cost | Security |
|---|---|---|---|
| Winternitz | $(n + 2)L$ | $n2^k + 1$ | $L - 1$ |
| HORS | $(n + 2^j)L$ | $n$ | $L - n \log_2 n$ |

The following discussion describes two flexible authentication schemes, namely FAS-I and FAS-II, that employ a combination of the Winternitz OTS scheme and the HORS OTS scheme discussed above. The flexible authentication schemes provide a tradeoff between the communication and computational overheads. Thus, for the Winternitz OTS scheme, the amount of public information that needs to be disseminated and the number of private key values that need to be stored is low, but the computational power that is required for the several layers of the hash functions is high. However, for the HORS OTS scheme, the amount of public information that needs to be disseminated and the number of private key values that need to be stored is high, but the computational overhead is low. The level of security that is desired would depend on how much hashing is done in the Winternitz scheme and how many private key values and verifiers are needed in the HORS OTS scheme. In other words, for the Winternitz OTS scheme, L=nk, and the communication overhead is linear in l and the computational overhead is exponential in k. Thus, an exponential increase in the computational overhead would have to be tolerated in order to gain a linear decrease in the communication overhead. For the HORS OTS scheme, again L=nj, and while the computational overhead is just n, the communication overhead is exponential in j.

The two flexible authentication schemes discussed below provide a better tradeoff between the two dimensions of overhead. In both of the flexible authentication schemes (FAS) that are discussed, the idea is to use some bits of the hash of the message to choose a random subset (a là HORS) and the other bits to select hash values derived from those subsets (a là Winternitz).

Figure 4:
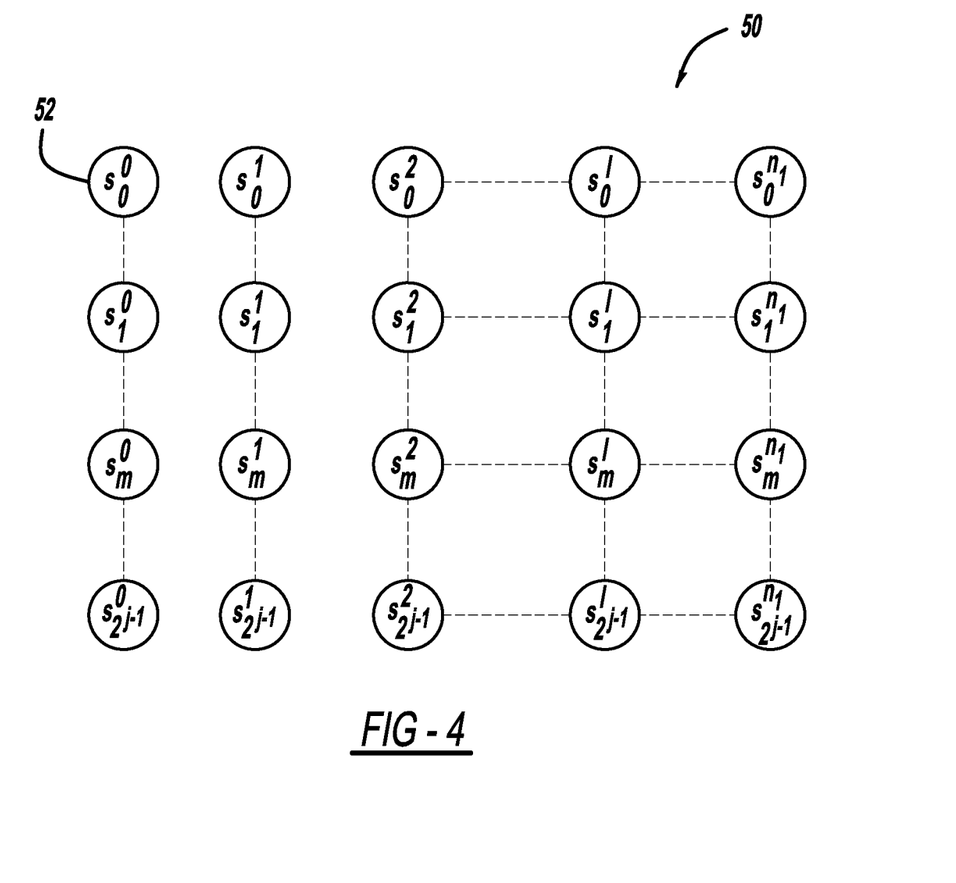
FIG. 4 is a matrix of private key values.

FIG. 4 is a matrix 50 of random private key values 52, or seals, chosen to form the private key S. Particularly, each row in the matrix 50 represents a series of private key values for a Winternitz OTS scheme and each column in the matrix 50 represents a series of private key values for a HORS OTS scheme.

Figure 5:
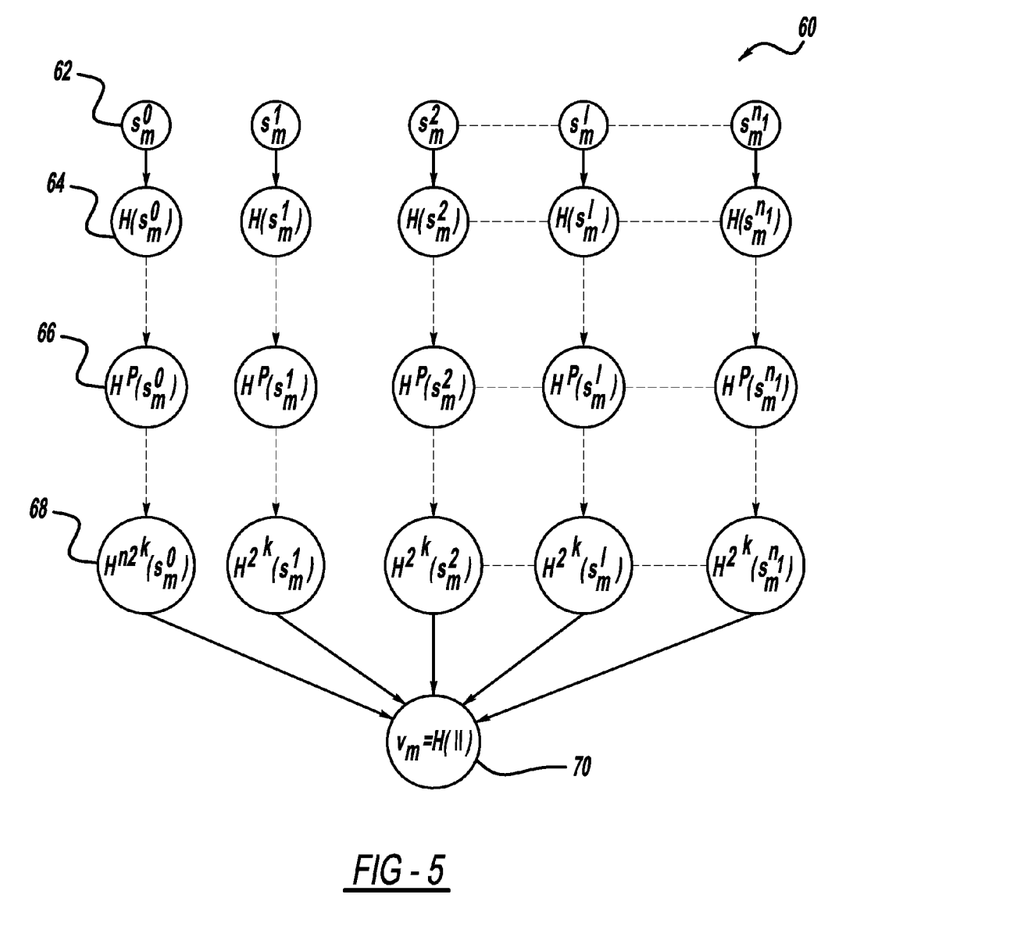
FIG. 5 is a plan view of a first flexible authentication scheme for authenticating wireless messages that uses the private key values shown in FIG. 4 and is a combination of the schemes shown in FIGS. 2 and 3, where every row of FIG. 4, a corresponding scheme of FIG. 5 can be obtained.

FIG. 5 is a plan view of the FAS-I OTS scheme that includes a series of private key values 62, represented as $s_m^0$, $s_m^1$, ..., $s_m^i$, ..., $s_m^{n_1}$ for the third row of private key values 52 shown in FIG. 4. A separate OTS scheme would be provided for each row of the private key values 52 for the matrix 50. The OTS scheme 60 provides three hash functions 64, 66 and 68, represented as H, $H^P$ and $H^{2^k}$, where the hash function 68 for all of the private key values 62 that have been hashed by the hash functions 64 and 66 are concatenated into a verifier 70, represented as $v_m$. Thus, each row in the matrix 50 provides a separate verifier $b_m$.

On each row in the matrix 50, a Winternitz key pair generation algorithm is run to generate the public key V for that row. The set of private key values 52 from each row constitutes the private keys S. To sign a message M, the hashed version of the message M is broken into two parts, namely signing bits and selection bits. The selection bits select which rows will be used to sign the message M and the signing bits are signed by the Winternitz signing algorithm using the values from that row.

Algorithm 7 below is a key generation and public key distribution algorithm for the authentication protocol that shows how the FAS-I OTS scheme generates the key pair S and V, including generation of the matrix 50. Algorithm 8 below is a signature generation algorithm for the authentication protocol that shows how the FAS-I OTS scheme provides the signature generation using the hash version or message digest. Algorithm 9 below is a signature verification algorithm for the authentication protocol that shows how the FAS-I OTS scheme provides signature verification in the receiving vehicle.

Algorithm 7, FAS-I Key Pair Generation:
Input: hash function H:$\{0,1\}^* \rightarrow \{0,1\}^L$, block parameter n, $n_1$, k and j
Output: signature key S, verification key V
 1: Choose n, $n_1$, k and j such that $L = n \cdot n_1 \cdot k + n \cdot j$
 2: Choose $s_0^0, s_0^1, \ldots, s_0^{n_1}, \ldots, s_m^0, s_m^1, \ldots, s_m^{n_1}, \ldots, s_{2^j-1}^0, s_{2^j-1}^1, \ldots, s_{2^j-1}^{n_1} \in_R \{0,1\}^L$ uniformly at random i.e. choose $(n_1+1)2^j$ random variables of length L
 3: Set $S = \{s_0^0, s_0^1, \ldots, s_0^{n_1}, \ldots, s_m^0, s_m^1, \ldots, s_m^{n_1}, \ldots, s_{2^j-1}^0, s_{2^j-1}^1, \ldots, s_{2^j-1}^{n_1}\}$
 4: For each $m \in \{0:2^j-1\}$ apply Winternitz key pair generation (Algorithm 1) for $s_m^0, s_m^1, \ldots, s_m^{n_1}$
 5: Denote public value of each m-th Winternitz structure as $v_m$
 6: Set $V = \{v_0, v_1, \ldots, v_m, \ldots, v_{2^j-1}\}$, where $\|$ denotes concatenation
 7: Private key: =S, Public key: =V
 8: return (S,V)

Figure 6:
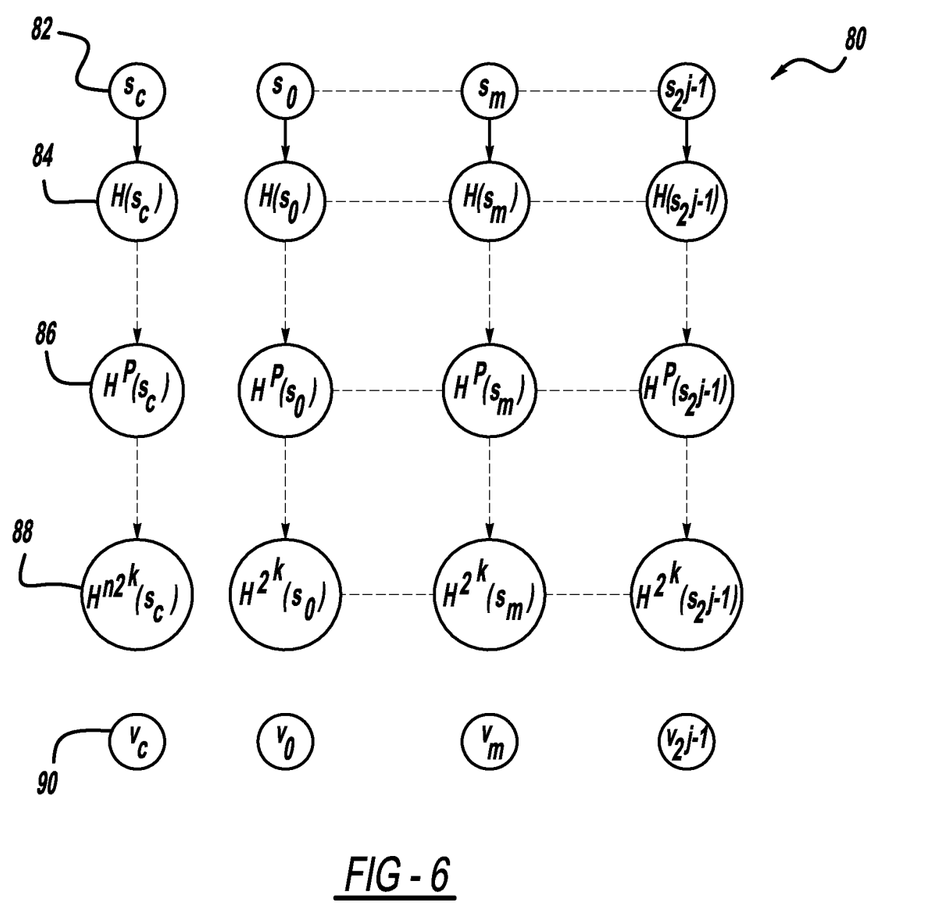
FIG. 6 is a plan view of a second flexible authentication scheme that is a combination of the schemes shown in FIGS. 2 and 3.

Algorithm 8, FAS-I OTS Signature Generation:
Input: hash function H:$\{0,1\}^* \rightarrow \{0,1\}^L$, block parameter n, $n_1$, k and j, Message M, signature key S
Output: One time signature $\sigma_M$ on M
 1: Compute H(M) from M
 2: Break H(M) in 'n', k-bit words and 'n' j bit words
 3: 'n' $n_1 k$ bits words are used for signing. They are denoted as $b_1^1, b_2^1, \ldots, b_{n_1}^1, b_1^2, b_2^2, \ldots, b_{n_1}^2, \ldots, b_1^n, b_2^n, \ldots, b_{n_1}^n$
 4: 'n' j bit words represent n indices in $\{1:2^j\}$ are used for selection. They are denoted as $m^1, m^2, \ldots, m^n$
 5: Compute $b_0^i = \Sigma_{l=1}^{n_1} b_l^i$ for each $i \in \{1:n\}$
 6: For each $m^i$ sign $(b_0^i, b_1^i, \ldots, b_{n_1}^i)$ using Winternitz signature (Algorithm 2) to generate $\sigma_{m^i}$
 7: The signature of M is $\sigma_M = [\sigma_{m^1} \| \sigma_{m^2} \| \ldots \| \sigma_{m^n}]$
 8: return $\sigma_M$ Algorithm 9 FAS-I OTS Signature Verification:
Input: hash function H:$\{0,1\}^* \rightarrow \{0,1\}^L$, block parameter n, $n_1$, k and j, Message M, signature $\sigma_M$, verification key V
Output: TRUE if the signature is valid, FALSE otherwise
 1: Compute $(b_1^1, b_2^1, \ldots, b_{n_1}^1, b_1^2, b_2^2, \ldots, b_{n_1}^2, \ldots, b_1^n, b_2^n, \ldots, b_{n_1}^n)$ and $(m^1, m^2, \ldots, m^n)$ as in Algorithm 8
 2: Verify each $v_m$ using Winternitz verification (Algorithm 3)
 3: If Algorithm 3 returns true for each $v_m$ then return TRUE, else return FALSE FIG. 6 is a plan view of an FAS-II OTS scheme 80 including a set of private key values 82, represented as $s_c, s_0, \ldots, s_m, \ldots, s_{2^j-1}$ and a series of hash functions 84, 86 and 88, represented as H, $H^P$ and $H^{2^k}$, respectively, where the results of the hash function 88 is a series of verifiers 90, represented as $b_c, b_0, b_n$ and $b_{2_{j-1}}$. A first set of random seals are chosen as the private key values 82 and a Winternitz like hash chains are built. The public key V consists of the final values of all the hash chains rather than the hash of their concatenation. To sign a message, the hashed version of the message M is broken into two parts, namely signing bits and selection bits. The selection bits select which of the private key values 82 will be used for signing and the signing bits are signed by an analogous process to the Winternitz signing algorithm.

Algorithm 10 below is a key generation and public key distribution algorithm for the authentication protocol that shows a process for generating the private and public key pair S and V in the FAS-II OTS scheme. Algorithm 11 below is a signature generation algorithm for the authentication protocol that shows a process for the signature generation for the FAS-II OTS scheme using the hash version or message digest. Algorithm 12 below is a signature verification algorithm for the authentication protocol that shows a process of how the signatures are verified in the receiver for the FAS-II OTS scheme.

Algorithm 10, FAS-II OTS Scheme Key Pair Generation:
Input: hash function $H:\{0,1\}^* \to \{0,1\}^L$, block parameter $n, k_1$ and $k_2$
Output: signature key S, verification key V
  1: Choose $n, k_1, k_2$ and $j$ such that $L = n(k+j)$
  2: Choose $s_0, s_1, \ldots, s_{2^j-1}, s_c \in_R \{0,1\}^L$ uniformly at random, i.e. choose $(2^j+1)$ random variables of length L
  3: Set $S = \{s_0, s_1, \ldots, s_{2^j-1}, s_c\}$
  4: Compute $y_i = H^{2^k}(s_i)$ for $i = 0, 1, 2, \ldots, 2^j-1$
  5: Compute $z = H^{n \cdot 2^k}(s_c)$
  6: Set $V = \{y_1 \| y_2 \| \ldots \| y_{2^j-1} \| z\}$ where $\|$ denotes concatenation
  7: Private key: $= S$, Public key: $= V$
  8: return $(S, V)$ Algorithm 11, FAS-II OTS Scheme Signature Generation:
Input: hash function $H:\{0,1\}^* \to \{0,1\}^L$, block parameter $n, k$ and $j$, such that $L = n(k+j)$, Message M, signature key S
Output: One time signature of $\sigma_M$ on M
  1: Compute $H(M)$ from M
  2: Break $H(M)$ in $n$, k-bit words and $n$, j-bit words
  3: $n$, k-bit words are used for signing. They are denoted as $b_1^1, b_2^1, \ldots, b_n^1$.
  4: $n$, j-bit words are used for selection. They are denoted as $b_1^2, b_2^1, \ldots, b_n^2$
  5: Compute $b_0 = \sum_{i=1}^{n} b_i^1$
  6: The signature of M is $\sigma_M = [H^{b_1^1}(s_{b_1^2}) \| H^{b_2^1}(s_{b_2^2}) \| \ldots \| H^{b_n^1}(s_{b_n^2}) \| H^{n \cdot 2^k - b_0}(s_c)]$
  7: return $\sigma_M$ Algorithm 12, FAS-II OTS Scheme Signature Verification:
Input: hash function $H:\{0,1\}^* \to \{0,1\}^L$, block parameter $n, k$ and $j$, such that $L = n(k+j)$, Message M, signature $\sigma_M$, verification key V
Output: TRUE if the signature is valid, FALSE otherwise
  1: Compute $b_1^1, b_2^1, \ldots, b_n^1, b_1^2, b_2^2, \ldots, b_n^2$ as in Algorithm 11
  2: Denote the $\sigma_M$ received as composed of $h_{b_1^2} \| h_{b_2^2} \| \ldots \| h_{b_n^2} \| h_c$
  3: Compute $x_i = H^{2^k - b_i^1}(h_{b_i^2})$ for $i = 1, 2, \ldots, n$
  4: Compute $w = H^{b_0}(h_c)$
  5: If $y_{b_i^2} = x_i$ for each $i = 1, \ldots, n$ and $w = z$, then return TRUE, else return FALSE The overhead associated with the FAS-I and FAS-II OTS schemes are shown in Table 2 below. The communication cost is given in terms of the number of bits. The computational cost is the verification time, and is given in terms of the number of hash operations required. The security level is given in number of bits. The security analysis used to derive the entries in the table is given below.

TABLE 2

| OTS Scheme | Communication Cost | Computation Cost | Security |
|---|---|---|---|
| FAS-I | $(n(n_1 + 1) + 2^j)L$ | $n(n_1 2^k + 1)$ | $L - n \log_2 n$ |
| FAS-II | $(n + 2^j + 2)L$ | $n 2^k + 1$ | $L - n \log_2 n$ |

The security analysis of the FAS-I and FAS-II OTS schemes is analogous to that of the HORS OTS scheme. The OTS scheme interest is in the probability that, after applying the hash unction H on a single message M, the advisory is able to forge a signature on the message M without inverting the one-way hash function H.

In the FAS-I scheme, the hash of the message M to be signed is broken up into 'n' j-bit words, which are used for selecting n out of $2^j$ rows and 'n'$n_1$ k-bit words, which are used to create a Winternitz OTS scheme on each of the n chosen rows. Thus, given a message M that hashes to m and its signature $\sigma$, forgoing a signature would require the attacker to find another message M' that hashes to m' such that its former $n \cdot n_1 \cdot k$ bits are identical to that of m, and that its latter $n \cdot j$ bits or 'n' j-bit words are some permutation of a subset of the latter 'n' j-bit works of m. Assuming a random oracle model for the hash function, the probability of this event is $$\frac{1}{2^{n \cdot n_1 \cdot k}} \cdot \left(\frac{n}{2^{n \cdot j}}\right)^n$$

which is nothing but $$\frac{n^n}{2^L}.$$

In the FAS-II scheme, the hash of the message M is broken up into 'n' words of length k+j. For each word, the last j bits are used to select a column. Thus, n columns are selected, and then the former k bits of all the n words are signed using the Winternitz signing algorithm. Thus, foregoing a signature would require the attacker to find another message M' that hashes to m' such that when broken up into 'n' words of length k+j, it would be a permutation of a subset of the 'n' words of length k+j of m. The probability of this event (again, assuming that H is random oracle) is a $$\left(\frac{n}{2^{n \cdot (k+j)}}\right)^n$$

which is nothing but $$\frac{n^n}{2^L}.$$

Therefore, the security of FAS-I and FAS-II is $L - n \log_2 n$ bits.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for authenticating a message that is transmitted wirelessly, said method comprising:

providing a matrix that includes rows of private key values and columns of private key values;

performing a key pair generation process that provides a key pair including a private key and a public key for each row in the matrix, said private key being the set of private key values for that row, wherein performing the key pair generation process includes applying a plurality of hash functions to the private key values where a succeeding hash function provides a hash of a previous hash function, wherein a concatenated value of the final hash values is the public key;

performing a signature generation process, using a microprocessor, that includes generating a message digest by applying a hash function on the message to be signed and separating the message digest into two parts including signing bits and selection bits where the selection bits select which row in the matrix will be used to sign the message and the signing bits are signed by a signing algorithm using the private key values from the selected row, and where performing the signature generation process uses the algorithm:

Input: hash function H: $\{0,1\}^* \rightarrow \{0,1\}^L$, block parameter $n, n_1, k$ and $j$,
message M, signature key S
Output: One time signature $\sigma_M$ on M
1: Compute H(M) from M
2: Break H(M) in 'n', k-bit words and 'n' j bit words
3: 'n' $n_1$k-bits words are used for signing. They are denoted as $b_1^1, b_2^1, \ldots, b_{n_1}^1, b_1^2, b_2^2, \ldots, b_{n_1}^2, \ldots, b_1^n, b_2^n, \ldots, b_{n_1}^n$
4: 'n' j bit words represent n indices in $\{1:2^j\}$ are used for selection,
They are denoted as $m^1, m^2, \ldots, m^n$
5: Compute $b_0^i = \Sigma_{l=1}^{n_1} b_l^i$ for each $i \in \{1:n\}$
6: For each $m^i$ sign $(b_0^i, b_1^i, \ldots, b_{n_1}^i)$ use Winternitz signature to generate $\sigma_{m^i}$
7: The signature of M is $\sigma_M = [\sigma_{m^i} \| \sigma_{m^i} \| \ldots \| \sigma_{m^n}]$
8: return $\sigma_M$;
and
performing a signature authentication process that includes using the key pair to authenticate the message.

2. The method according to claim 1 wherein the private key values in each row of the matrix are Winternitz private key values and the private key values in each column of the matrix are hash to obtain random subset private key values.

3. The method according to claim 1 wherein performing the key pair generation process uses the algorithm:
Input: hash function H:$\{0,1\}^* \rightarrow \{0,1\}^L$, block parameter $n, n_1, k$ and $j$
Output: signature key S, verification key V
1: Choose $n, n_1, k$ and $j$ such that $L = n \cdot n_1 \cdot k + n \cdot j$
2: Choose $S_0^0, S_0^1, \ldots, S_0^{n_1}, \ldots, S_m^0, S_m^1, \ldots, S_m^{n_1}, \ldots, S_{2^{j-1}}^0, S_{2^{j-1}}^1, \ldots, S_{2^{j-1}}^{n_1} \in_R \{0,1\}^L$ uniformly at random, i.e., choose $(n_1+1)2^j$ random variables of length L
3: Set $S = \{S_0^0, S_0^1, \ldots, S_0^{n_1}, \ldots, S_m^0, S_m^1, \ldots, S_m^{n_1}, \ldots, S_{2^{j-1}}^0, S_{2^{j-1}}^1, \ldots, S_{2^{j-1}}^{n_1}\}$
4: For each $m \in \{0:2^{j-1}\}$ apply Winternitz key pair generation for $S_m^0, S_m^1, \ldots, S_m^{n_1}$
5: Denote public value of each m-th Winternitz structure as $v_m$
6: Set $V = \{v_0, v_1, \ldots, v_m, \ldots, v_{2^{j-1}}\}$, where $\|$ denotes concatenation
7: Private key:=S, Public key :=V
8: return (S, V).

4. The method according to claim 1 wherein performing the signature verification process uses the algorithm:
Input: hash function H:$\{0,1\}^* \rightarrow \{0,1\}^L$, block parameter $n, n_1, k$ and $j$,
message M, signature $\sigma_m$, verification key V
Output: TRUE if the signature is valid, FALSE otherwise
1: Compute $(b_1^1, b_2^1, \ldots, b_{n_1}^1, b_1^2, b_2^2, \ldots, b_{n_1}^2, \ldots, b_1^n, b_2^n, \ldots, b_{n_1}^n)$ and $(m^1, m^2, \ldots, m^n)$
2: Verify each $v_m$ using Winternitz verification
3: If verification returns true for each $v_m$ then return TRUE, else return FALSE.

5. The method according to claim 1 wherein the message is transmitted wirelessly from one vehicle to another vehicle.

6. A method for authenticating a message that is transmitted wirelessly, said method comprising:

providing a plurality of private key values where a set of private key values is a private key;

performing a key pair generation process that provides a key pair including a private key and a public key, said private key being the set of private key values, wherein performing a key pair generation process includes applying a plurality of hash functions to the private key values where a succeeding hash function provides a hash of a previous hash function, and wherein a final hash function provides the public key;

performing a signature generation process, using a microprocessor, that includes generating a message digest by applying a hash function on the message to be signed and signing the message digest by separating the message digest into two parts including signing bits and selection bits where the selection bits select which of the private key values will be used for signing and the signing bits are signed, and where performing the signature generation process uses the algorithm:

Input: hash function H:$\{0,1\}^* \rightarrow \{0,1\}^L$, block parameter $n, k$ and $j$, such that $L = n(k+j)$, message M, signature key S
Output: One time signature of $\sigma_m$ on M
1: Compute H(M) from M
2: Break H(M) in n,k-bit words and n,j -bit words
3: n,k -bit words are used for signing, where they are denoted as $b_1^1, b_2^1, \ldots, b_n^1$,
4: n, j-bit words are used for selection, where they are denoted as $b_1^2, b_2^1, \ldots, b_n^2$
5: Compute $b_0 = \Sigma_{i=i}^n b_i^1$
6: The signature of M is $\sigma_m = [H^{b_1^1}(S_{b_1^2}) \| H^{b_2^1}(S_{b_2^2}) \| \ldots \| H^{b_n^1}(S_{b_n^2}) \| H^{n \cdot 2^{k} \cdot b_0}(S_c)]$
7: return $\sigma_m$;
and
performing a signature authentication process that includes using the key pair to authenticate the message.

7. The method according to claim 6 wherein the method employs a one-time signature process that is a combination of a Winternitz one-time signature scheme and a hash to obtain random subset one-time signature scheme.

8. The method according to claim 6 wherein performing the key pair generation process uses the algorithm:
Input: hash function H:$\{0,1\}^* \rightarrow \{0,1\}^L$ block parameter n, $k_1$ and $k_2$
Output: signature key S, verification key V
1: Choose n, $k_1, k_2$ and j such that $L = n(k+j)$
2: Choose $s_0, s_1, \ldots, s_{2^{j-1}}, s_c \in_R \{0,1\}^L$ uniformly at random, i.e choose $(2^j+1)$ random variables of length L
3: Set $S = \{s_0, s_1, \ldots, s_{2^{j-1}}, s_c\}$
4: Compute $y_i = H^{2^k}(s_i)$ for $i = 0, 1, 2, \ldots, 2^{j-1}$ 5: Compute $z=H^{n\cdot 2^k}(s_c)$
6: Set $V=\{y_1\|y_2\|\ldots\|y_{2^{j-1}}\|z\}$ where $\|$ denotes concatenation
7: Private key: $=S$, Public key: $=V$
8: return $(S,V)$.

9. The method according to claim 6 wherein performing the signature verification process uses the algorithm:
   Input: hash function $H:\{0,1\}^*\to\{0,1\}^L$, block parameter n, k and j, such that $L=n(k+j)$, message M, signature $\sigma_M$, verification key V
   Output: TRUE if the signature is valid, FALSE otherwise
   1: Compute $b_1^1, b_2^1, \ldots, b_{n_1}^1, b_1^2, b_2^2, \ldots, b_n^2$ as in Algorithm 11
   2: Denote the $\sigma_M$ received as composed of $\hat{h}_{b_1^2}\|\hat{h}_{b_2^2}\|\ldots\|\hat{h}_{b_n^2}\|\hat{h}_c$
   3: Compute $x_i = H^{2^k-b_i^1}(\hat{h}_{b_i^2})$ for $i=1, 2, \ldots, n$
   4: Compute $w = H^{b_0}(\hat{h}_c)$
   5: If $y_{b_i^2} = x_i$ for each $i=1, \ldots, n$ and $w=z$, then return TRUE, else return FALSE.

10. The method according to claim 6 wherein the message is transmitted wirelessly from one vehicle to another vehicle.

11. A method for authenticating a message that is transmitted wirelessly, said method comprising:
   providing a set of private key values that define a private key;
   performing a key pair generation process that provides a key pair including the private key and a public key, wherein performing the key pair generation process includes applying one or more hash functions to the private key values where a succeeding hash function provides a hash of a previous hash function, and wherein a final hash function provides the public key;
   performing a signature generation process, using a microprocessor, that includes generating a message digest by applying a hash function on the message to be signed and separating the message digest into two parts including signing bits and selection bits, and where performing the signature generation process uses the algorithm:
   Input: hash function $H:\{0,1\}^* \to \{0,1\}_L$, block parameter $n, n_1, k$ and j, message M, signature key S
   Output: One time signature $\sigma_m$ on M
   1: Compute $H(M)$ from M
   2: Break $H(M)$ in 'n', k-bit words and 'n'j bit words
   3: 'n' $n_1 k$ bits words are used for signing. They are denoted as $b_1^1, b_2^1, \ldots, b_{n_1}^1, b_1^2, b_2^2, \ldots, b_{n_1}^2, \ldots, b_1^n, b_2^n, \ldots, b_{n_1}^n$
   4: 'n'j bit words represent n indices in $\{1:2^j\}$ are used for selection,
   They are denoted as $m^1, m^2, \ldots, m^n$
   5: Compute $b_0^i = \Sigma_{l=1}^{n_1} b_l^i$ for each $i \in \{1:n\}$
   6: For each $m^i$ sign $(b_0^i, b_1^i, \ldots, b_{n_1}^i)$ use Winternitz signature to generate $\sigma_{m^i}$
   7: The signature of M is $\sigma_M = [\sigma_{m^1}\|\sigma_{m^i}\|\ldots\|\sigma_{m^n}]$
   8: return $\sigma_m$;
   and
   performing a signature authentication process that includes using the key pair to authenticate the message.

12. The method according to claim 11 wherein performing the key pair generation process uses the algorithm:
   Input: hash function $H:\{0,1\}^*\to\{0,1\}^L$, block parameter $n, n_1, k$ and j
   Output: signature key S, verification key V
   1: Choose $n, n_1, k$ and j such that $L = n \cdot n_1 \cdot k + n \cdot j$
   2: Choose $s_0^0, s_0^1, \ldots, s_0^{n_1}, \ldots, s_m^0, s_m^1, \ldots, s_m^{n_1}, \ldots, s_{2^{j}-1}^0, s_{2^{j}-1}^1, \ldots,$
   $s_{2^{j}-1}^{n_1} \in_R \{0,1\}^L$ uniformly at random, i.e., choose $(n_1+1)2^j$ random variables of length L
   3: Set $S = \{s_0^0, s_0^1, \ldots, s_0^{n_1}, \ldots, s_m^0, s_m^1, \ldots, s_m^{n_1}, \ldots, s_{2^{j}-1}^0, s_{2^{j}-1}^1, \ldots, s_{2^{j}-1}^{n_1}\}$
   4: For each $m \in \{0:2^{j-1}\}$ apply Winternitz key pair generation for $s_m^0, s_m^1, \ldots, s_m^{n_1}$
   5: Denote public value of each m-th Winternitz structure as $v_m$
   6: Set $V = \{v_0, v_1, \ldots, v_m, \ldots, v_{2^{j}-1}\}$, where $\|$ denotes concatenation
   7: Private key: $=S$, Public key: $=V$
   8: return $(S, V)$.

13. The method according to claim 11 wherein performing the signature verification process uses the algorithm:
   Input: hash function $H:\{0,1\}^*\to\{0,1\}^L$, block parameter $n, n_1, k$ and j, message M, signature $\sigma_M$, verification key V
   Output: TRUE if the signature is valid, FALSE otherwise
   1: Compute $(b_1^1, b_2^1, \ldots, b_{n_1}^1, b_1^2, b_2^2, \ldots, b_{n_1}^2, \ldots, b_1^n, b_2^n, \ldots, b_{n_1}^n)$ and $(m^1, m^2, \ldots, m^n)$
   2: Verify each $v_m$ using Winternitz verification
   3: If verification returns true for each $v_m$ then return TRUE, else return FALSE.

14. The method according to claim 11 wherein the message is transmitted wirelessly from one vehicle to another vehicle.

* * * * *